United States Patent [19]

Walker

[11] Patent Number: 4,628,429
[45] Date of Patent: * Dec. 9, 1986

[54] DC-DC CONVERTER WITH GALVANICALLY ISOLATED FEEDBACK VOLTAGE REGULATION

[75] Inventor: John D. Walker, Coventry, England

[73] Assignee: The General Electric Company, p.l.c., England

[*] Notice: The portion of the term of this patent subsequent to Dec. 9, 2003 has been disclaimed.

[21] Appl. No.: 671,239

[22] Filed: Nov. 14, 1984

[30] Foreign Application Priority Data

Dec. 23, 1983 [GB] United Kingdom ............... 8334372

[51] Int. Cl.⁴ .......................................... H02M 3/335
[52] U.S. Cl. ....................................... 363/21; 363/97
[58] Field of Search ............... 363/21, 89, 95, 97; 323/242, 243, 288, 326

[56] References Cited

U.S. PATENT DOCUMENTS

| 4,124,884 | 11/1978 | Episcopo | 363/21 |
| 4,135,233 | 1/1979 | Seiersen | 363/21 |
| 4,439,821 | 3/1984 | Grippe | 363/97 |
| 4,499,530 | 2/1985 | Onda et al. | 363/21 |
| 4,566,060 | 1/1981 | Hoeksma | 363/97 |

Primary Examiner—Patrick R. Salce
Assistant Examiner—D. L. Rebsch
Attorney, Agent, or Firm—Kirschstein, Kirschstein, Ottinger & Israel

[57] ABSTRACT

A switched mode power supply has a sense transformer (TX2) with three windings. A first (primary) winding (WD) is in series with the primary winding (WP1) of the power transformer (TX1). Current regulation of the output is provided via a second (sense) winding (WS). Voltage regulation of the output is provided by a further (third) winding (WC) being connected in parallel with the secondary winding (WP2) of the power transformer for producing isolated feedback of an output voltage error signal using the sense transformer (TX2) as a current summing transformer.

4 Claims, 2 Drawing Figures

DC-DC CONVERTER WITH GALVANICALLY ISOLATED FEEDBACK VOLTAGE REGULATION

This invention relates to DC-DC converters.

Converters of this type known as switched-mode power supplies (SMPS) have a d.c. input applied to the primary winding of a transformer (the power transformer) in series with a power switch which is switched on and off at a frequency generated internally in the power supply, and the signal at a secondary winding of the power transformer is rectified and filtered to give a required d.c. output. Output voltage regulation can be provided by producing a voltage error signal from the output which is transferred across the galvanic isolation boundary provided by the power transformer. The transferred voltage error signal is applied to vary the on-off ratio of the power switch, i.e. to provide pulse-width modulation (PWM).

Various techniques have been proposed for transferring the above-mentioned voltage error signal back across the isolation boundary for the modulation. One such technique uses an opto-isolator; this technique lacks reliability because the opto-isolator performance degrades with life and also because it does not work in a fail-safe mode, i.e. if the opto-isolator fails, the power supply output voltage goes overvoltage. Another such technique uses at least two additional transformers and a small auxiliary power supply together with additional complex circuitry; this technique is very expensive. Yet another such technique uses a high impedance resistive link; this technique is not acceptable where true galvanic isolation is required.

An object of this invention is to provide an alternative technique for transferring the voltage error signal back across the isolation boundary and using it for pulse-width modulation without the disadvantages of the proposed techniques just described.

According to the invention there is provided a DC-DC converter, in which the primary winding of a sense transformer is in series with the primary winding of a power transformer and a power switch, in which the on-off ratio of the power switch is variable in accordance with the time taken for a voltage dependent on the sense current in a secondary winding of the sense transformer to reach a reference value, in which the current in the primary winding of the sense transformer is dependent on the d.c. output current of the converter, whereby current regulation of the converter output is provided via said sense current, in which a further winding of the sense transformer and a rectifier are connected in a series path which is in parallel with a secondary winding of the power transformer, such that unipolar current in said further winding is switched synchronously with the current in the primary winding of the sense transformer and said sense current is dependent on the current in said further winding in addition to the current in the primary winding of the sense transformer, and in which means are provided to derive a voltage error signal from the d.c. output voltage of the converter and to vary the amplitude of the switched current in said series path including said further winding responsive to the voltage error signal, whereby voltage regulation of the converter output is also provided via said sense current.

The conventional method of pulse-width modulation for output voltage regulation in switched-mode power supply DC-DC converters involves comparison of the voltage error signal fed back across the transformer isolation boundary with a fixed ramp waveform voltage. The use of a sense transformer having its primary winding in series with the primary winding of the power transformer whereby the switched current in these two windings is monitored by a sense current in a secondary winding of the sense transformer, the sense current enabling current regulation of the converter output, is known per se. The use of the rising sense current for comparison with a fixed constant level reference signal, which may be termed "current mode control" has been proposed as an alternative technique to provide pulse-width modulation but has not been commonly adopted.

The basic idea of this invention is to provide the further winding of the sense transformer as a means for producing isolated feedback of an output voltage error signal using the sense transformer as a current summing transformer. There are thus effectively two feedback loops, a current regulation feedback loop and a voltage regulation feedback loop, with one embedded in the other.

A DC-DC single-ended forward converter in accordance with the invention will now be described in detail with reference to the accompanying drawing, in which.

Figure 1:
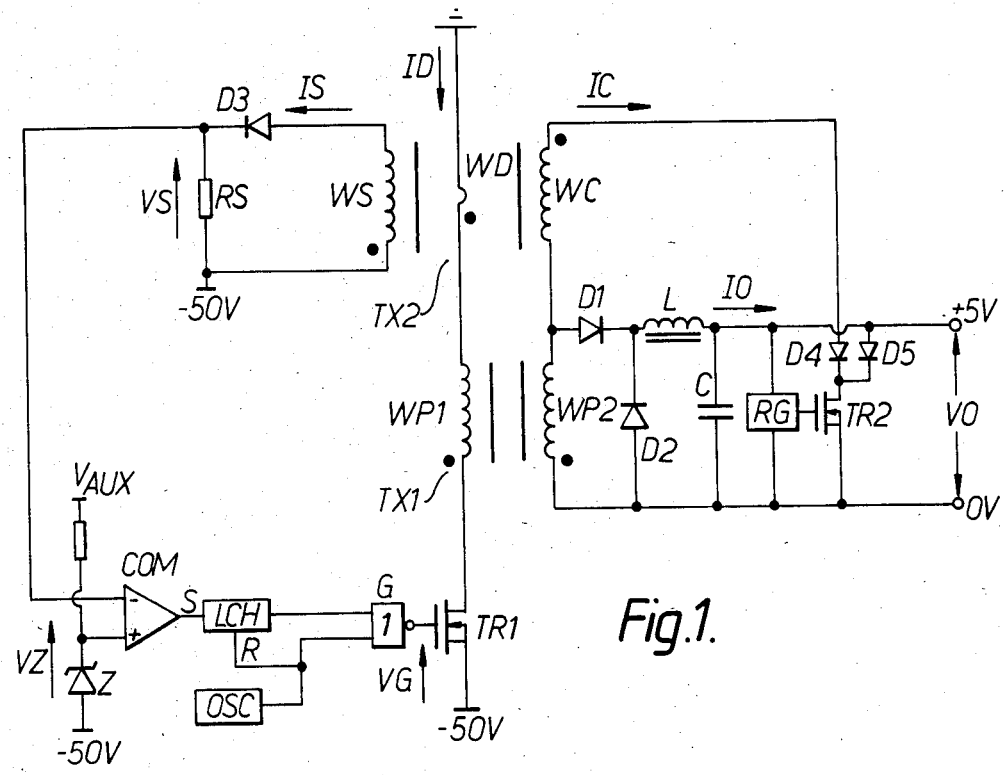
FIG. 1 is a circuit diagram of the converter.
Figure 2:
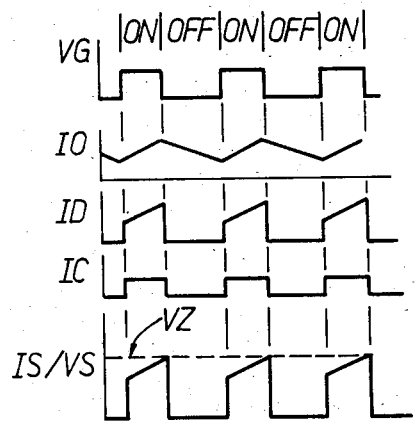
FIG. 2 shows current and voltage waveforms at various parts of the circuit of FIG. 1 in a steady state condition.

Referring now to the drawing, the circuit includes the basic topology of a single-ended forward converter type of switched mode power supply suitable for producing a +5 volt d.c. output supply for computer circuits from a −50 volt d.c. input supply derived from a telephone system. This basic topology consists of a power transformer TX1 having its primary winding WP1 connected in series with a power switch TR1 (shown as a field effect transistor) and the −50 volt d.c. input supply, the secondary winding WP2 of the transformer TX1 being connected to the rectifying diodes D1 and D2 and the filtering and smoothing inductor L and capacitor C to produce the +5 volt d.c. output supply VO. The power switch TR1 is turned on and off by the gate voltage output VG of a gate G, the frequency at which the gate voltage VG is pulsed being 100 KHz, determined by an oscillator OSC, and the on-off ratio being responsive to information fed back from the output of the converter in the manner to be described.

A sense transformer TX2 has a primary winding WD connected in series with the primary winding WP1 of the power transformer TX1, the power switch TR1 and the −50 volt d.c. input supply. As shown, the windings WD and WP1 and the switch TR1 carry a current ID. A secondary winding WS of the sense transformer TX2 carries a sense current IS which, via a rectifying diode D3, develops a unipolar voltage VS across a sense resistor RS relative to −50 volts connected to one end of the resistor RS.

A comparator COM has the voltage VS applied to one input and a reference voltage VZ applied to its other input. The reference voltage VZ is 5.6 volts across a zener diode Z relative to −50 volts. When the power switch TR1 is turned on, the current ID is turned on and rises at a certain rate determined by the inductance of the circuit. The current IS and the voltage VS rise as the current ID rises until, in each cycle of the power switch TR1, the voltage VS reaches the reference voltage VZ. At this time the output of the comparator COM sets a latch circuit LCH via its input S, and the output of the latch circuit LCH turns off the power switch TR1 via the gate G. The arrangement is such that the 'on' period of the switch TR1 is always less than its 'off' period, that is, the switch TR1 is turned off in each cycle by the output of the latch circuit LCH at some time before it would otherwise be turned off by the rising edge of the output of the oscillator OSC. The following falling edge of the output of the oscillator OSC is effective each time to reset the latch circuit LCH via its input R and to turn on the power switch TR1 via the gate G.

$V_{AUX}$ is suitably +12 volts relative to −50 volts and can be derived from the main −50 volt d.c. input supply, for example by a 12 volt zener diode and resistor connected across the main supply, a transistor buffer and a local decoupling capacitor. These components for deriving $V_{AUX}$, which is also used as a supply voltage for the oscillator, latch and gate circuits, are now shown.

A further winding WC of the sense transformer TX2 and a rectifying diode D4 are connected in a series path with a field effect transistor TR2, the series path being connected in parallel with the secondary winding WP2 of the power transformer TX1 such that the further winding WC carries a unipolar current IC which is switched synchronously with the current ID in the primary winding WD of the sense transformer TX2.

A regulator RG includes a voltage reference device supplying a constant voltage of 1.2 volts and an error amplifier which compares this constant voltage with a fraction of the 5 volt converter output voltage VO to produce a voltage error signal which varies the amplitude of the switched current IC via the transistor TR2. The voltage error signal is arranged in such a phase that if the amplitude of the converter output voltage VO increases, then the amplitude of the current IC also increases. A diode D5 provides current through the transistor TR2 during the 'off' periods of the current IC in the further winding WC to prevent switching effects from being injected onto the output of the regulator RG.

The sense transformer TX2 is a current summing transformer according to the equation $$IS \times NS = ID \times ND + IC \times NC$$

where NS, ND and NC are the number of turns in the windings WS, WD and WC respectively and the windings are poled in the relationship according to the dot notation shown in the drawing.

The current and voltage waveforms shown in the drawing illustrate a steady state of operation of the circuit, that is, where there is a constant input voltage and a constant load. Under these conditions the current IC and the on-off ratio of the power switch TR1 will adjust to whatever values are necessary to maintain the required output voltage of the converter.

The above-defined ampere-turns and hence current summing equation and the steady state waveforms shown in the drawing enable the essence of the 'current mode' control provided by the circuit to be understood. Thus if, at the beginning of the 'on' period of a given cycle of the power switch TR1, the amplitude of either the current ID or the amplitude of the current IC is increased, compared with its value in the previous cycle, then the amplitude of the current IS is correspondingly increased, the voltage VS will reach the reference voltage VZ correspondingly earlier and the duration of the 'on' period of the power switch TR1 will be correspondingly reduced.

The output current IO of the converter, that is the current through the inductor L, rises during the 'on' period of the power switch TR1 and falls during the 'off' period of the power switch TR1. There is thus a small a.c. component in what is essentially a d.c. current output. The current ID through the power switch TR1 is proportional to the output current IO. Thus if the current IO suddenly starts at a higher amplitude at the beginning of the 'on' period of a given cycle of the power switch compared with its value in the previous cycle, then the amplitude of the current ID is proportionally, increased and therefore so is the current IS, with the result that this 'on' period is terminated earlier than in the previous cycle, and immediate correction of the peak value and hence also the average d.c. value of the output current IO is provided. Thus current protection and regulation of the converter output is provided on a fast cycle by cycle basis by a first feedback loop with galvanic isolation via the sense transformer TX2.

The basic topology of the single-ended forward converter, as described at the beginning of the description with reference to the drawing, is such that the output current IO does not fall to zero during the 'off' period of the power switch TR1 and the converter exhibits a very low open loop d.c. output impedance and hence essentially good voltage regulation. Thus, changes in the load will not produce large or fast changes in the on-off ratio of the power switch TR1. However, fine control of the output voltage is provided slowly over a number of cycles by change in the voltage error signal produced by the regulator RG, producing a small change in the current IC and hence a small change in the on-off ratio per cycle. Thus this fine control voltage regulation of the converter output is provided by a second feedback loop with galvanic isolation via the sense transformer TX2.

There are thus effectively two feedback loops, with one embedded in the other.

The whole converter circuit shown in the drawings and described above can be considered as a voltage controlled current source. That is to say that it essentially provides a constant current, but that current is adjusted by the voltage error signal in order to produce a constant voltage.

I claim:

1. A DC-DC converter in which a primary winding of a sense transformer is in series with a primary winding of a power transformer and a power switch
   (a) in which a rising sense current in a secondary winding of the sene transformer during each on-period of the power switch develops a unipolar sense voltage which is applied by galvanic connection of the sense winding to one input of a comparator, a fixed reference voltage being applied to the other input of the comparator whereby the end of each said on-period is responsive to the output of the comparator which is galvanically connected to the power switch,
   (b) in which the rising current in the primary winding of the sense transformer during each said on-period is dependent on the d.c. output current of the converter whereby current regulation of the converter output is provided via said sense current, (c) in which a further winding of the sense transformer and a rectifier are connected in a series path which is in parallel with a secondary winding of the power transformer such that said further winding carries a unipolar current which is of substantially constant amplitude during each said on-period and is switched synchronously with the current in the primary winding of the sense transformer, (d) in which error signal means are provided to derive a voltage error signal from the d.c. output voltage of the converter, in which control means to which the voltage error signal is applied are provided in said series path including said further winding so that the constant amplitude of the current in said further winding during each on-period of the power switch is determined by the voltage error signal, (e) and in which the amplitude of said rising sense current during each said on-period is determined by the additive effect of the constant current in said further winding and the rising current in the primary winding of the sense transformer, whereby voltage regulation of the converter output is also provided via said sense current.

2. A DC-DC converter as claimed in claim 1, having the configuration of a single-ended forward converter.

3. A DC-DC converter as claimed in claim 1 suitable for converting a telephone system supply voltage to a computer circuit supply voltage.

4. A DC-DC converter as claimed in claim 2 suitable for converting a telephone system supply voltage to a computer circuit supply voltage.

* * * * *